Dec. 6, 1960  C. E. CLARK  2,962,835
WATER CONDITIONING UNIT FOR LIVE BAIT CONTAINERS
Filed Feb. 21, 1957  2 Sheets-Sheet 1

INVENTOR.
Charles E. Clark
BY Paul E. Mullendore
ATTORNEY

Dec. 6, 1960

C. E. CLARK 2,962,835

WATER CONDITIONING UNIT FOR LIVE BAIT CONTAINERS

Filed Feb. 21, 1957

INVENTOR.
Charles E. Clark

BY Paul E. Mullendore
ATTORNEY

United States Patent Office 2,962,835
Patented Dec. 6, 1960

2,962,835

WATER CONDITIONING UNIT FOR LIVE BAIT CONTAINERS

Charles E. Clark, Joplin, Mo., assignor to Benesh-Clark Engineering Company, Bettendorf, Iowa, a partnership Filed Feb. 21, 1957, Ser. No. 641,561

1 Claim. (Cl. 43—56)

This invention relates to a device for conditioning the water in which live bait is contained. A fisherman obtains live bait where it is available and often transports the bait long distances before use, and the bait must be kept alive and active to furnish effective lures when fishing begins. Live bait, such as minnows, crayfish, shrimp, and the like, is usually carried in a minnow bucket or other container capable of holding a quantity of water to keep the bait alive, but the water soon becomes stagnant and the oxygen content is used up. Also, in hot weather the water becomes too warm for the good of the bait. These effects on the water necessitate the chore of changing the water, but fresh water may not always be conveniently available and changing of the water is neglected.

With the above in mind, it is a principal object of the present invention to provide a small self-contained water conditioning unit by which the water at the surface is continually removed and dispersed or sprayed through the air space in the container to carry back oxygen necessary for freshening the water in which the bait is contained.

A further object of the invention is to provide the water conditioning unit with means for effectively and calmly circulating air into and out of the air space simultaneously with operation of the spray.

Other objects of the invention are to provide the air conditioning unit with a water spraying element that automatically adjusts itself to the surface level of the water to lift the water therefrom and disperse it across the container for contact with the air; to provide a water spraying element which is free of any projections that might injure the bait, but which is shaped to elevate the water by centrifugal action and to discharge it at high velocity into the air space incidental to high speed rotation of the spray element; to provide a simple, inexpensive battery operated motor for driving a rotary element; to provide a simple and effective flexible connection between the driving shaft of the motor and the driven shaft for the rotary element to facilitate self adjustment of the rotary element on the surface of the water; to provide the unit with spacers for supporting the unit upon the lid of a minnow bucket and maintaining space for flow of air into and out of the container; and to provide spacers of resilient character to eliminate possibility of transmitting vibrations through the walls of the bucket that might tend to excite or cause discomfort to the bait.

In accomplishing these and other objects of the invention as hereinafter pointed out, improved structure has been provided, the preferred form of which is illustrated in the accompanying drawings, wherein.

Figure 1:
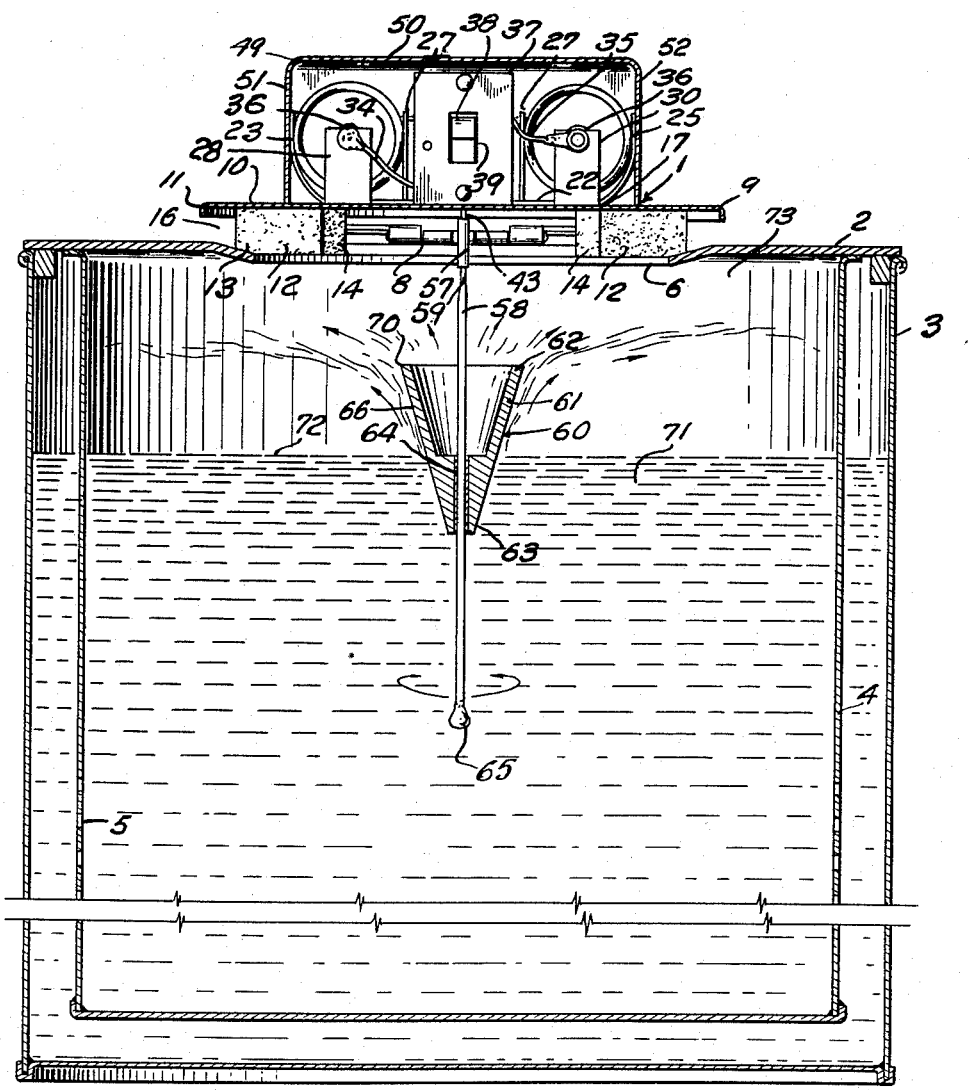
Fig. 1 is a vertical section through a minnow bucket equipped with a water conditioning unit embodying the features of the present invention, the unit also being shown in vertical section.
Figure 2:
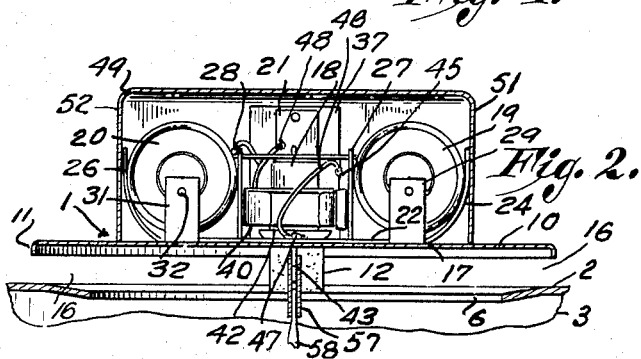
Fig. 2 is a fragmentary section through the motor and battery portion of the unit, with the section being taken on the line 2—2 of Fig. 5. The vertical portion of fixture 17 is not shown for reasons of clarity.

Referring more in detail to the drawings:

1 designates a water conditioning unit constructed in accordance with the present invention and that is adapted for support on the cover 2 of a minnow bucket 3, or other container. The cover 2 of the convention minnow bucket carries an inner container 4 having an apertured wall portion 5 to permit the water to empty into the container 3 when the inner container 4 is lifted out, to permit easy access to the bait when contained therein. The cover 2 has a central opening 6 through which the bait is inserted and removed, and the opening is ordinarily closed by a lid 7 that is connected to one side of the cover 2 by a hinge 8. The minnow bucket thus described forms no part of the present invention, but is illustrated to give a better understanding of the invention. The invention, however, is adapted to any container in which live bait may be carried and which has an opening 6 in the cover therefor to accommodate the unit 1, now to be described.

Figure 3:
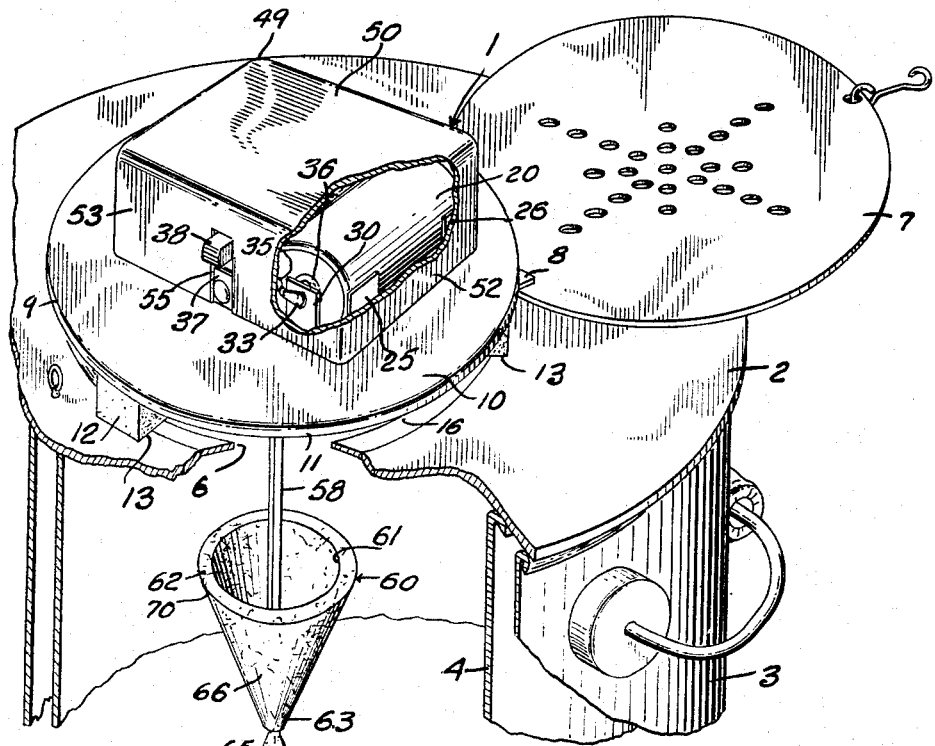
Fig. 3 is a perspective view of the upper portion of a minnow bucket with the conditioning unit in place and portions of the bucket being broken away to better illustrate the water spraying element.
Figure 4:
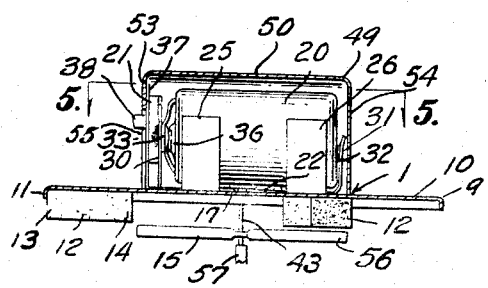
Fig. 4 is a section through the motor portion of the unit and showing an air circulating impeller on the driving shaft for moving air into and out of the air space in the minnow bucket.

The unit 1 includes a base 9, which in the illustrated instance has a circular plate portion 10 of larger diameter than the opening 6 to cover the opening and substitute for the lid 7 when the unit 1 is in use. The plate 10 is preferably reinforced by a depending peripheral flange 11, so that it may be constructed of relatively light gauge material. Attached to the under side of the plate 10 is a plurality of circumferentially spaced apart spacers or feet 12, preferably formed of resilient material, such as rubber or the like. The spacers or feet 12 may be cemented or otherwise attached to the under side of the plate 10 and in position so that outer ends 13 thereof seat on the marginal portion of the cover 2 that encircles the opening 6, as shown in Figs. 1 and 3. The spacers 12, being of resilient material, such as rubber, have sufficient contact with the cover 2 to prevent shifting of the unit 1 thereon. The inner ends 14 terminate considerably short of the axis of the plate 10 to leave space for an impeller 15 (see. Fig. 4), if an impeller is desired, to move air into and out of the annular space 16 between the cover 2 and flange 11.

Mounted on the base 9 is a fixture 17 for retaining an electric motor 18, batteries 19 and 20 at the respective sides of the motor, and a switch 21. The fixture 17 is preferably stamped from sheet metal of spring-like character, but which may be shaped to form the mixture. The fixture 17 includes a substantially flat portion 22 of generally rectangular shape. Curving outwardly and upwardly from the ends of the portion 22 are pairs of tongs 23—24 and 25—26 having a curvature to engage with the sides of the batteries and to cooperate with insulating strips 27 at the sides of the motor 18 to provide clips for gripping and retaining the batteries 19 and 20 therebetween. The side edges of the plate portion 22 of the fixture have tongues 28—29 and 30—31 which extend upwardly in alignment with ends of the batteries. The tongues 29—31 have prongs 32 forming ground contacts engageable with bottoms of the battery casings. The tongues 28 and 30 carry contacts 33 that are insulated from the metal of the fixture to connect with conductors 34 and 35. The contacts 33 are retained in resilient contact with the positive terminals 36 of the batteries incidental to the spring action of the metal of the fixture.

Also formed as a part of the fixture and extending outwardly from one edge of the plate portion and thence upwardly is a tongue 37 for mounting the switch 21. The switch 21 has a toggle lever 38 projecting through an opening 39 in the tongue, as best shown in Fig. 1.

The motor 18 includes a frame 40 for carrying the shaft 41 which mounts the armature 42 in a vertical position with the shaft 41 extending through suitable openings in the fixture plate portion of the base 9, whereby the lower end 43 extends into the air space of the minnow bucket when the unit is in use, as later described.

The motor 18 has terminals 44 and 45, one of which is connected by a conductor 46 to a ground connection 47 on the fixture, and the other terminal is connected by a conductor 48 with one terminal of the switch 21. The conductors 34 and 35 are connected with the other terminal of the switch to complete an electric circuit between the motor and the batteries whenever the switch is closed.

Figure 5:
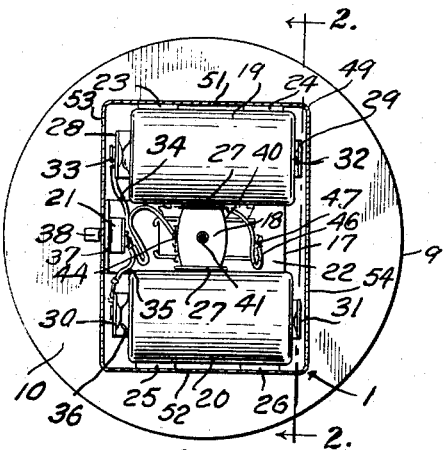
Fig. 5 is a horizontal section on the line 5—5 of Fig. 4.
Figure 6:
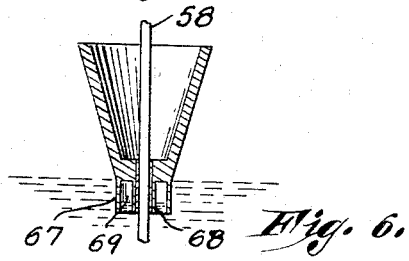
Fig. 6 is a vertical section through a modified form of water lifting and spraying element.

The motor 18, batteries 19 and 20, and the switch 21 are all enclosed within a casing 49 having a top 50, ends 51 and 52, and front and back sides 53 and 54, all preferably stamped from sheet metal to provide a unitary construction. The casing 49 is open at the bottom and is of a size so that the ends slide snugly over the spring tongues 23—24 and 25—26 and over the tongues 29—31 at one side and the tongue 37 at the other, as best shown in Fig. 5. The casing is thus frictionally retained in position on the base, but may be easily removed therefrom when it becomes necessary to renew the batteries. The front wall 53 of the casing has a slot 55 opening upwardly through the lower edge thereof to accommodate the projecting end of the toggle lever 38 by which the switch is operated, as shown in Fig. 3.

The depending end 43 of the motor shaft 41 provides a mounting for an impeller 56 and a connection for a flexible coupling 57 to suspend a shaft 58. The coupling 57 preferably consists of a resilient tube having one end sleeved over the depending end 43 of the motor shaft 41 and the other end sleeved over an end 59 of the driven shaft 58. The shaft 58 carries the water lifting and spraying element 60, now to be described.

The element 60 is formed of light weight buoyant material, preferably of light weight plastic, nonaffected by the water, but which is adapted to float thereon. The element 60 consists of an inverted cone having an upwardly and outwardly flaring wall 61 terminating in a rim 62 at the base. The apex portion 63 of the cone is preferably provided with an axial bushing 64 fixed in the material of the cone and which has an inner diameter of a size to be freely slidable on the depending shaft 58. The shaft 58 and bushing have a cross sectional shape to provide a driving connection between the shaft and the cone, so that when the motor is in operation, the shaft will rotate the cone while the cone is floating upon the surface of the water in the minnow bucket. To prevent displacement of the cone when the unit is lifted from the bucket, the shaft 58 has a stop or knob 65 on the lower end thereof and on which the cone is adapted to seat, as shown in Fig. 3.

The cone is thus supported with its apex 63 in the water and the wall portion 61 of the cone extends upwardly and outwardly to provide a surface 66 on which the water is adapted to travel upwardly and outwardly incidental to centrifugal action when the cone is in rotation.

It is desirable that the cone have a minimum submergence in the water, and to better accommodate this requirement, the apical portion of the cone may be shaped to provide a depending skirt portion 67 which encircles the shaft 58 in spaced relation therewith and which cooperates with the exterior of the bushing 68 to form an annular air space 69. The space, being closed at the upper end and open to the water at its lower end, provides a trap for air to exclude water from entering the cone, thereby promoting the buoyancy of the cone. This is important, not only in reducing friction of the water on the cone, but also to control the amount of the water that is lifted upwardly and outwardly on the outer surface of the cone incidental to centrifugal action.

The conical surface 66 of the cone 60 is preferably smooth to provide for ready flow of the water thereover, and the rim 62 provides an annular edge 70 from which the water is discharged in a relatively thin sheet, which disperses into a mist or fine droplets as the water is propelled across the air space in contact with the air therein.

In using the water conditioning unit constructed and assembled as described, water is poured into the bucket 3 up to the desired level to leave an air space in the upper portion thereof. The live bait, such as minnows, crayfish, shrimp, and the like, is then placed in the inner container 4. The water conditioning unit 1 is then placed on the cover 2 of the bucket 3, with the shaft 58 and spray element 60 thereon passing through the opening 6 until the spacers 12 contact the lid 2. During mounting of the unit 1, the spray element 60, on making contact with the water 71, is stopped thereby, while the shaft 58 continues its movement therethrough so that the spray element 60 floats freely on the surface 72 of the water. The toggle lever 38 is actuated to close the motor circuit. Energization of the motor causes the shaft 41 to rotate to rotate the shaft 58 through the flexible connection 57. Rotation of the shaft 58 rotates the spray element 60, so that the water making contact with the conical surface 66 is caused to move upwardly and outwardly along the surface 66 until it is discharged from the outer edge 70 of the rim 62 in the form of a thin film, which breaks up into droplets as the water travels radially through the air space 73, during which time the water picks up oxygen from the air to maintain an ample oxygen content of the water in the bucket. If the motor shaft 41 is equipped with an impeller 56, air is simultaneously drawn through the space 16 and into the air space 73 in the top of the bucket at the same time air is displaced from the air space 73, so that a fresh supply of air is being maintained for contact with the water spray.

It is also found that the circulation of the air in contact with the water spray reduces the temperature of the water, so that the water is kept cooler to prevent injury to the live bait during warm weather.

It has been found that small flashlight batteries are capable of operating the motor for the duration of the average fishing trip. When it becomes necessary to replace the batteries 19 and 20, the casing 49 is readily removed, after which the old batteries are removed from the clips and new batteries placed therein, after which the casing 49 is returned to position to protect the motor and batteries.

The form of spray element shown in Fig. 4 operates in substantially the same manner as the spray element shown in Figs. 1 and 3, however, because of the air space trapped in the lower portion of the cone, the float will have less contact with the body of water, to reduce the drag on the motor and thereby effect a higher speed to better break up the spray and effect better contact with the air in the bucket. What is claimed and desired to be secured by Letters Patent is:

A water-conditioning unit for a live bait container of the character described, the said water-conditioning unit comprising a minnow basket embodying a cover having a centrally located opening therein and an apertured wall secured to the underside thereof, a plate larger than the opening in the cover, the said plate being mounted on said cover and over the said opening by means of a plurality of resilient feet secured to the underside of said plate in radial spaced relation to each other thereby providing an air space between the underside of the plate and the opening in the top of the cover; a battery powered electric motor mounted in the center of said plate, said motor having a shaft extending downwardly through the opening in said cover, a driven shaft secured to the lower end of the first-mentioned shaft by means of a flexible coupling and extending downwardly through the opening in said cover, at least one battery removably mounted beside the said motor, the battery being adapted to operate said motor by means of a manually operated switch secured to said plate, and a floating water-spraying element slidably mounted on the driven shaft which is square in cross-section and has its lower end terminating in a knob to prevent the said spraying element from sliding off the lower end of the driven shaft, the said knob also having a stabilizing effect on the said shaft by reason of its weight, the said water-spraying element both rotating with the shaft and sliding upwardly on the shaft when the said water-conditioning unit is placed in a live bait container having water placed therein and when the said electric switch is closed.

References Cited in the file of this patent

UNITED STATES PATENTS

| | | |
|---|---|---|
| 1,952,269 | Lundquist | Mar. 27, 1934 |
| 2,042,176 | Hausman | May 26, 1936 |
| 2,062,158 | Berlowitz | Nov. 24, 1936 |
| 2,137,397 | Haldeman | Nov. 22, 1938 |
| 2,554,867 | Mills | May 29, 1951 |
| 2,639,906 | Butler | May 26, 1953 |
| 2,766,027 | Herr | Oct. 9, 1956 |
| 2,783,088 | Butler | Feb. 26, 1957 |
| 2,820,619 | Dache | Jan. 21, 1958 |